United States Patent

Trimble

[15] 3,693,101

[45] Sept. 19, 1972

[54] TIME DELAY CIRCUIT

[72] Inventor: Philip K. Trimble, Rochester, Mich.

[73] Assignee: General Motors Corporation, Detroit, Mich.

[22] Filed: Sept. 7, 1971

[21] Appl. No.: 178,344

[52] U.S. Cl. ..................328/177, 307/234, 307/293, 328/55, 328/147, 328/167

[51] Int. Cl. ..........................H03k 3/53, H03k 5/153

[58] Field of Search ........307/234, 246, 293; 328/55, 328/146, 147, 167, 177

[56] References Cited

UNITED STATES PATENTS 3,244,907 4/1966 Daigle, Jr. ................328/55 X 3,504,288 3/1970 Ross ......................307/273 X 3,539,934 11/1970 Rudolph ................307/273 X 3,602,743 8/1971 Shazo, Jr. ..................307/293

*Primary Examiner*—Stanley D. Miller, Jr.

*Attorney*—Jean L. Carpenter, Paul Fitzpatrick and Warren D. Hill

[57] ABSTRACT

A train of variable width pulses is time delayed by a circuit comprising an array of operational amplifiers arranged as comparators. One comparator includes a time delay and filter circuit for discriminating against very short pulses and reproducing all other pulses after a time delay. Two other comparators have time delays of equal length responsive to the leading and trailing ends of each pulse and control a final comparator which reproduces the original pulse train except for the very short pulses.

3 Claims, 2 Drawing Figures

Figure 1:
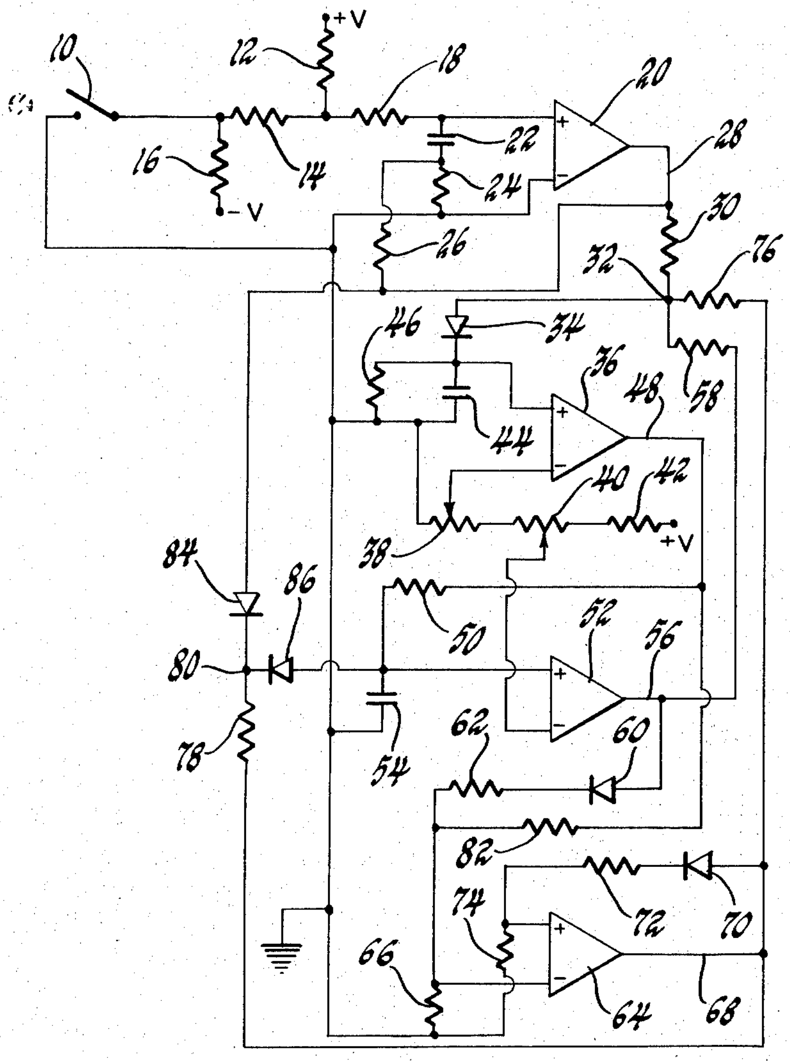

INVENTOR.
Philip K. Trimble
BY
Warren D. Hill
ATTORNEY

TIME DELAY CIRCUIT

This invention relates to time delay circuits and particularly to a circuit for delaying transmission of variable width square wave pulses.

It is often desired to reproduce an electrical signal at some delayed time after the event of the original signal. Where the time delay is of the order of ½ or 1 second, such delays have previously been accomplished by expensive and complicated means such as magnetically recording the signal and reading out the signal at the desired time. Further, it is sometimes desired to operate a mechanical device according to a time delay signal wherein the device is unable to properly respond to very short pulses so that it is desirable to remove such pulses from the delayed signal.

It is therefore an object of this invention to provide a relatively simple and inexpensive time delay circuit for square wave pulses.

It is another object of the invention to provide a time delay circuit capable of discriminating against pulses of a predetermined minimum duration.

The invention is carried out by providing a pair of switching devices such as operational amplifier comparators, each equipped with a time delay, one time delay effective at the leading edge of each pulse and the other effective at the trailing edge of each pulse, and a similar switching device responsive to the outputs of the other switching devices for reproducing the input signals. The invention further contemplates a signal conditioning input circuit comprising a switching device with a filter and time delay for discriminating against short pulses and for delaying both leading and trailing edges of the original signal.

Figure 2:
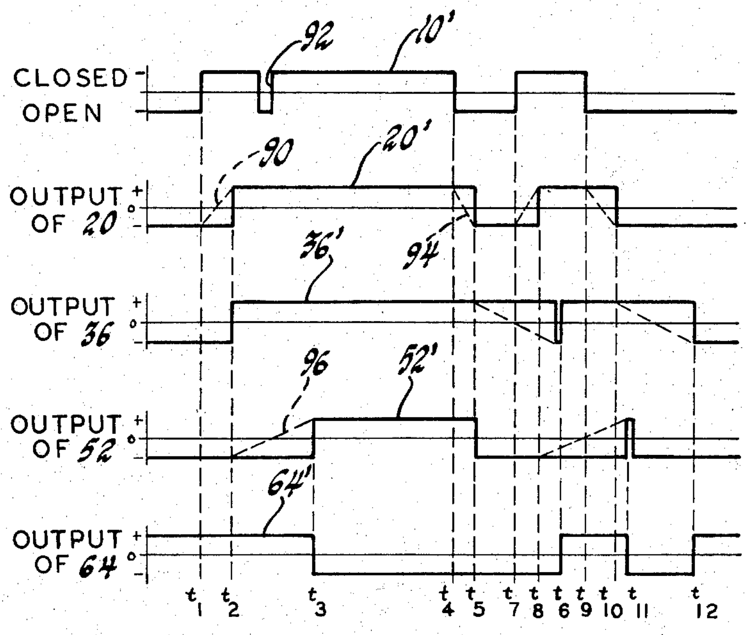

The above and other advantages will be made more apparent from the following specification taken in conjunction with the accompanying drawings wherein like reference numerals refer to like parts and wherein:

FIG. 1 is a schematic electrical diagram of a time delay circuit according to the invention; and, FIG. 2 is an illustration of waveforms occurring in various sections of the circuit of FIG. 1.

The preferred embodiment of the invention as depicted in FIG. 1 is directed to a circuit intended to effect a time dealy of 0.8 seconds of a train of variable width square wave pulses generated by the opening and closing of a switch 10. It will be apparent, however, that the nature of the source of the square wave pulses is immaterial. The circuit is further intended to discriminate against pulses of less than 0.2 seconds in duration while passing pulses of greater width. A power supply, not shown, provides voltages+V and −V which typically are +15v and −15v. The switch 10 is grounded at one side while the other side is connected to the midpoint of a voltage divider comprising resistors 12, 14 and 16 extending from +V to −V, the resistors being selected so that a negative voltage is present at the midpoint when the switch 10 is opened. The voltage divider is connected through a resistor 18 to the positive input of an operational amplifier 20, the negative input of which is grounded. A capacitor 22 and a resistor 24 are serially connected across the input terminals and in combination with resistor 18 provide a time delay circuit. A resistor 26 is connected from the junction point of the capacitor 22 and resistor 24 to the output of the amplifier 20. The amplifier output on line 28 is connected through a resistor 30 to a junction point 32 which in turn is connected through a diode 34 to the positive input terminal of an operational amplifier 36. The negative terminal is connected to a potentiometer 38 which is serially connected with a potentiometer 40 and resistor 42 between the +V supply and ground. A time delay circuit comprising a capacitor 44 and a resistor 46 in parallel is connected between the positive terminal of the amplifier 36 and ground. The amplifier is thus arranged as a comparator in that a reference voltage is selected by adjustment of the potentiometer 38 so that the polarity of the output then will depend on whether the voltage so that the polarity of the output then will depend on whether the voltage across the capacitor 44 is above or below the reference potential. The output of the operational amplifier 36 on line 48 is connected through a resistor 50 to the positive terminal of the operational amplifier 52 which has its negative input connected to the potentiometer 40. The positive input is connected through a capacitor 54 to ground so that the resistor 50 and capacitor 54 in combination provide a time delay action. The operational amplifier 52 therefore also serves as a comparator which switches when the voltage across capacitor 54 crosses the reference voltage from potentiometer 40. The output of the operational amplifier 52 on line 56 is connected through a resistor 58 to the junction point 32 and is also connected through a diode 60 and a resistor 62 to the negative input of an operational amplifier 64. The negative input terminal is also connected through a resistor 66 to ground. The output of the operational amplifier 64 on line 68 is connected through a diode 70 and a feedback resistor 72 to the positive input terminal which is also connected to ground through a biasing resistor 74. The output line 68, which forms the output of the time delay circuit, is connected through a resistor 76 to the junction point 32 and is also connected through a resistor 78 to a junction point 80. The negative input terminal of the operational amplifier 64 is connected through a resistor 82 to the line 48 at the output of the operational amplifier 36. The operational amplifier 64 then also serves as a comparator which changes state according to the relative voltages at the input terminals. The junction point 80 is connected to the output of the operational amplifier 20 and the positive input of the operational amplifier 52 by diodes 84 and 86 respectively.

In operation of the time delay circuit, with the switch 10 open and the circuit in a steady state condition, the operational amplifiers 20, 36 and 52 have negative outputs while the operational amplifier 64 has a positive output.

The waveforms of FIG. 2 illustrate the states of the switch 10, the outputs of the operational amplifiers 20, 36, 52 and 64 respectively. When, at time $t_1$ the switch 10 closes as shown by waveform 10′, the voltage on capacitor 22 in initially negative and then increases toward a zero potential. This action requires 0.2 seconds and is indicated by the dashed line 90 in conjunction with the waveform 20′. When the 0.2 seconds has expired, at time $t_2$, the capacitor voltage reaches zero potential and the operational amplifier 20 switches so that its output signal 20′ becomes positive. In the event the switch 10 remains closed for less than 0.2 seconds, the operational amplifier 20 will not switch thereby filtering out the short duration pulses.

Similarly, as is indicated at 92, on the waveform 10', when the switch opens for a period of less than 0.2 seconds, the output 20' is not affected. When, however, the switch 10 opens for more than 0.2 seconds, the capacitor 22 will discharge as indicated at 94 in waveform 20' and the operational amplifier 20 will reset to a negative output value. Therefore, the operational amplifier 20 and its associated circuitry comprises a signal conditioning circuit which discriminates against short pulses and introduces a time delay of 0.2 seconds. The output of the amplifier 20, when it becomes positive at time $t_2$, quickly charges the capacitor 44 through the diode 34 causing the amplifier 36 to change state so that the waveform 36' becomes positive. That output in turn slowly charges the capacitor 54 through the resistor 50. After 0.6 seconds the voltage on capacitor 54 as represented by the dashed line 96, reaches the reference potential on the potentiometer 40 causing the amplifier 52 to switch to a positive value as indicated on waveform 52' and simultaneously cause the amplifier 64 to switch to a negative output state at time $t_3$ as indicated on the waveform 64'. At time $t_4$ when the switch 10 opens, the capacitor 22 begins to discharge as mentioned previously so that after a delay of 0.2 seconds at point $t_5$, the amplifier 20 switches to a negative state to backbias the diode 34 allowing the capacitor 44 to slowly discharge through resistor 46. After 0.6 seconds, as determined by the setting of potentiometer 38, voltage on capacitor 44 becomes sufficiently low at time $t_6$ to switch amplifier 36 to its negative state. At time $t_5$, the junction point 80 became negative because the signals on lines 28 and 68 became negative allowing the capacitor 54 to rapidly discharge through the diode 86 and the resistor 78 to switch the amplifier 52 to its negative state. At that time, however, the amplifier 64 does not change state because the positive voltage on line 48 acting through resistor 82 is sufficient to latch the amplifier 64 in its negative output state, although that voltage is not sufficient to switch the amplifier 64 to a negative state when the output of amplifier 52 is negative. At time $t_6$, however, the waveform 36' becomes negative causing the amplifier 64 to change to a positive state thereby completing the negative output pulse on waveform 64' which is equal in duration to the closed period of the switch 10 except for the short pulse 92 which was inhibited. The output pulse, of course, is delayed by 0.8 seconds.

When at time $t_7$ the switch 10 closes again, the capacitor 22 begins to charge and then 0.2 seconds later, at time $t_8$, the amplifier 20 switches to a positive output. Since the lines 56 and 68 are negative at this time, the junction point 32 will be negative and the diode 34 is backbiased so that the positive signal on line 28 does not interfere with the discharge of the capacitor 44. However, since the line 28 becomes positive, the junction point 80 is likewise positive to backbias the diode 86 causing the capacitor 54 to charge by virtue of the positive voltage on line 48. Since at time $t_6$ the line 68 becomes positive, the diode 34 is no longer backbiased so that the amplifier 36 switches positive immediately after having switched negative, thus resulting in a very short negative spike. The negative spike does not significantly affect the charging of the capacitor 54. Thus the resistors 30, 58 and 76 feeding into the junction point 32 form an inhibit network which prevents disruption of the time delay circuit including capacitor 44 when lines 58 and 76 are negative. At time $t_9$ the switch 10 opens and 0.2 seconds later at time $t_{10}$ the amplifier 20 becomes negative and the capacitor 44 begins discharging. At time $t_{11}$ the capacitor 54 has become fully charged to turn the amplifier 52 output positive causing the amplifier 64 to become negative. At that time lines 68 and 28 are negative allowing capacitor 54 to quickly discharge so that amplifier 52 switches negative again. Then at time $t_{12}$, the capacitor 44 has become discharged to allow amplifier 36 output to become negative which unlatches the amplifier 64 allowing it to become positive, thereby producing a second output between times $t_1$ and $t_{12}$, which is a reproduction of the second switch closing event which begins at time $t_7$.

The time delay circuit therefore reproduces at a later time the input signals from the switch 10 even though newer input signals are overlapping in time with the output signals. There is an exception to this, however, in that if the line 68 is negative during an open switch event of less than 0.4 seconds, that switch event will not register in the output. This anomoly may be avoided by judicious selection of the time constants. For example, if the time constant of the circuit including capacitor 22 is 0.3 seconds, then this exception will not occur.

The embodiment of the invention described herein is for purposes of illustration and the scope of the invention is intended to be limited only by the following claims.

It is claimed:

1. A time delay circuit for delaying a train of variable width square wave pulses comprising first switching means for changing state upon receipt of an input pulse to produce a first output signal including a first time delay means for delaying a change of state of the first switching means only upon removal of the input pulse, second switching means responsive to the first output signal to produce a second output signal including a second time delay means for delaying the change of state of the second switching means only upon receipt of the first output signal, the periods of the first and second time delays being substantially equal, third switching means responsive to the second output signal for changing state upon receipt of the second output signal to initiate an output pulse, and further responsive to the first output signal to terminate the output pulse when both the first and second output signal are terminated, means for resetting the second switching means in response to an output pulse in the absence of the input pulse, and means responsive to the output pulse for inhibiting the effects of the input pulse on the first timing means in the absence of the second output signal.

2. A time delay circuit for delaying a train of variable width square wave pulses comprising a signal conditioning circuit responsive to each square wave pulse for generating an input pulse equal in width to the square wave pulse and including a filter and time delay circuit for delaying the input pulse for a predetermined time after the square wave pulse and inhibiting any input pulse of duration less than the predetermined time, first switching means for changing state upon receipt of an input pulse to produce a first output signal including a first time delay means for delaying a change of state of the first switching means only upon removal of the input pulse, second switching means responsive to the first output signal to produce a second output signal including a second time delay means for delaying the change of state of the second switching means only upon receipt of the first output signal, the periods of the first and second time delays being substantially equal, third switching means responsive to the second output signal for changing state upon receipt of the second output signal to initiate an output pulse, and further responsive to the first output signal to terminate the output pulse when both the first and second output signals are terminated, means for resetting the second switching means in response to the output pulse in the absence of the input pulse and means responsive to the output pulse for inhibiting the effects of the input pulse on the first timing means in the absence of the second output signal.

3. A time delay circuit for delaying a train of variable width square wave pulses comprising a first operational amplifier connected as a comparator circuit for changing state upon receipt of an input pulse to produce a first output signal including a first time delay circuit at the input thereof for delaying a change of state of the comparator circuit only upon removal of the input pulse, a second operational amplifier connected as a comparator circuit responsive to the first output signal to produce a second output signal including a second time delay circuit at the input thereof for delaying the change of state of the second comparator circuit only upon receipt of the first output signal, the time delays of the first and second time delay circuits being substantially equal, a third operational amplifier connected as a comparator circuit responsive to the second output signal for changing state upon receipt of the second output signal to initiate an output pulse, and further responsive to the first output signal to terminate the output pulse when both the first and second output signal are terminated, means for resetting the second switching means in response to the output pulse in the absence of the input pulse, and means responsive to the output pulse for inhibiting the effects of the input pulse on the first timing means in the absence of the second output signal.

* * * * *